A. G. MACHESNEY.
FLANGE LUBRICATOR FOR LOCOMOTIVES.
APPLICATION FILED AUG. 21, 1917.
1,286,695.
Patented Dec. 3, 1918.
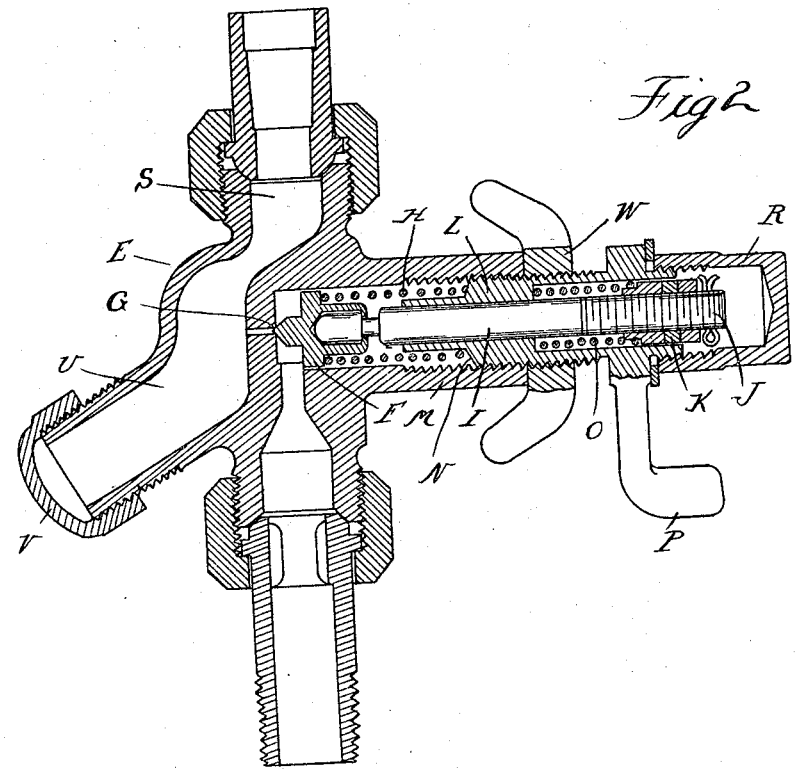
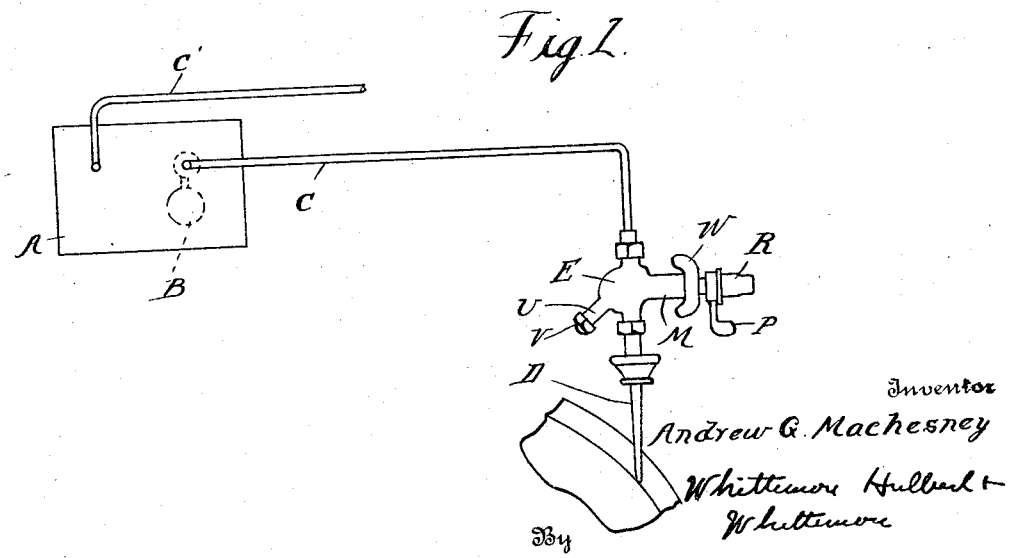

UNITED STATES PATENT OFFICE.

ANDREW G. MACHESNEY, OF PHILADELPHIA, PENNSYLVANIA, ASSIGNOR TO DETROIT LUBRICATOR COMPANY, OF DETROIT, MICHIGAN, A CORPORATION OF MICHIGAN.

FLANGE-LUBRICATOR FOR LOCOMOTIVES.

1,286,695.      Specification of Letters Patent.      Patented Dec. 3, 1918.

Application filed August 21, 1917. Serial No. 187,462.

*To all whom it may concern:*

Be it known that I, ANDREW G. MACHESNEY, a citizen of the United States of America, residing at Philadelphia, in the county of Philadelphia and State of Pennsylvania, have invented certain new and useful Improvements in Flange-Lubricators for Locomotives, of which the following is a specification, reference being had therein to the accompanying drawings.

The invention relates to flange lubricators for locomotives of that type in which the pumping of the lubricant is effected by the swaying of a pendulum due to lateral vibrations in the movement of the train. The present invention has more particular reference to the means employed for regulating the flow of the lubricant and timing its discharge, together with other features of improvement as hereinafter set forth.

In the drawings:

Figure 1 is a diagrammatic view showing the lubricating system;

Fig. 2 is a longitudinal section through the controller.

A is the lubricant receptacle, B is the pendulum-operated mechanism therein for pumping the lubricant through conduits C and C' to the flanges of the wheels upon opposite sides of the locomotive, and D is a discharge nozzle for directing the lubricant on to the flange; all of these parts being of any suitable construction.

With the construction as thus far described, there will be a discharge of lubricant through the conduits C and C' due to the vibration of the pendulum, even where the locomotive is running upon straight track. But whenever there is a curve in the track there will be a more violent vibration of the pendulum which will discharge a proportionately larger quantity of the lubricant. If, however, the conduits C and C' are of considerable length, there is no assurance that the discharge of lubricant from the nozzle will be timed exactly to the operation of the pump. Thus when the locomotive is on a curve and additional lubrication is required for the heavier duty of the flange the pump will discharge a larger quantity of lubricant into the conduits, but this may not reach the discharge nozzle until after the curve is passed. I have therefore devised a regulator which times the discharge of the lubricant at the nozzle to the operation of the pump, which also regulates the flow according to conditions, such as the character of the oil, temperature, etc.,—the construction being as follows:

E is a fitting located in each of the conduits C and C' at a point in close proximity to the discharge nozzle D. This fitting contains a check-valve F which is held to its seat G by the pressure of a spring H surrounding the stem I. This stem is preferably connected to the valve so as to permit of a pivotal movement, allowing the valve to find its seat without reference to the alinement of the stem. The outer end of the stem is threaded at J to engage correspondingly-threaded collars K. L is a bushing or sleeve member fitting around the stem I and having a threaded engagement with the nipple M of the casing. This bushing is provided with a shoulder N forming an abutment for the spring H, and beyond this abutment the bushing is counterbored or recessed to receive a spring O engaging the adjustable collars K, said spring acting as a partial counterbalance for the spring H. P is a handle for rotating the bushing L to adjust the same inward or outward in the threaded nipple, and W is a lock-nut for holding the bushing at different points of adjustment. R is a hollow cap for covering the end of the bushing and stem I, permitting of removal to adjust the collars K when necessary.

With the construction as described, the tension of the springs H and O may be readily adjusted in relation to each other so as to produce the desired yielding pressure of the valve F against its seat G. This pressure is opposed to the pressure of lubricant from the inlet passage S in the casing E, and consequently when the pressure rises sufficiently to overcome the spring the valve will be forced from its seat, permitting discharge of lubricant into the outlet passage. This outlet being in immediate proximity to the discharge nozzle D, will permit the almost instantaneous transfer of the lubricant passing the valve to the flange of the wheel. If the character of the lubricant is changed or if the flow is altered by reason of temperature or from any other cause, the tension of the springs may be adjusted to produce the desired effect.

The fitting E is also provided with a sediment chamber U communicating with the inlet S and having a removable cap V. The valve-seat G is upon a side-wall of this chamber, and consequently any sediment that is carried with the lubricant into the chamber will have a chance to settle without being deposited upon the seat. By reason of this sediment remover a very low grade of lubricant may be used without danger of clogging the valve or interfering with proper operation.

What I claim as my invention is:

1. In a locomotive flange lubricator, the combination with means actuated by the oscillations of the locomotive for variably pumping lubricant, of a conduit for conveying the lubricant from the pump to the flange to be lubricated, and an adjustably tensioned check-valve in said conduit adjacent to the point of discharge for yieldably resisting the passage of lubricant, whereby the timing of discharge is coincident with the operation of the pump.

2. In a locomotive flange lubricator, a controller for the discharge of lubricant comprising a check-valve actuated by the discharged lubricant, means for applying resilient pressure to said valve to hold the same to its seat, and means for adjusting said pressure to secure a predetermined time of operation of said valve from its seat.

3. In a locomotive flange lubricator, a controller comprising a fitting having inlet and discharge passages, a valve seated to obstruct communication between said inlet and discharge, a spring yieldably holding said valve to its seat, a stem pivotally connected to said valve, a sleeve surrounding said stem forming a guide-bearing therefor and providing an abutment for said spring, a recess or counter-bore in said sleeve, a spring therein, a collar adjustably engaging said stem and bearing against said spring, said springs acting counter to each other, and means for adjusting the tension of said springs relative to each other.

4. In a locomotive flange lubricator, the combination with a fitting having inlet and outlet passages, of a check-valve seated to obstruct connection between said inlet and outlet passages, means for yieldably holding said check-valve to its seat, and a sediment chamber communicating with the inlet passage adjacent to its seat.

5. In a locomotive flange lubricator, the combination with a fitting having inlet and outlet passages, with a passage-way connecting said passages and in a side wall thereof, of a check-valve adapted to engage in said passage-way, means for yieldably holding said check-valve in engagement therewith, and a sediment chamber communicating with said inlet passage adjacent to said passage-way in the side wall.

In testimony whereof I affix my signature.

ANDREW G. MACHESNEY.